United States Patent
Amos et al.

(10) Patent No.: US 9,725,636 B2
(45) Date of Patent: Aug. 8, 2017

(54) FLUID COMPOSITION COMPRISING GLASS MICROSPHERES AND METHOD OF MAKING AND USING THE SAME

(75) Inventors: Stephen E. Amos, Minneapolis, MN (US); Andrew S. D'Souza, Shoreview, MN (US); Clara E. Mata, Lindstrom, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 610 days.

(21) Appl. No.: 13/883,136

(22) PCT Filed: Oct. 28, 2011

(86) PCT No.: PCT/US2011/058363
§ 371 (c)(1),
(2), (4) Date: May 2, 2013

(87) PCT Pub. No.: WO2012/061241
PCT Pub. Date: May 10, 2012

(65) Prior Publication Data
US 2013/0225455 A1    Aug. 29, 2013

Related U.S. Application Data

(60) Provisional application No. 61/409,762, filed on Nov. 3, 2010.

(51) Int. Cl.
*C09K 8/08* (2006.01)

(52) U.S. Cl.
CPC ..................... *C09K 8/08* (2013.01)

(58) Field of Classification Search
USPC ........................ 507/111, 112, 110
See application file for complete search history.

(56) References Cited

U.S. PATENT DOCUMENTS

| | | | |
|---|---|---|---|
| 2,978,340 A | 4/1961 | Veatch et al. | |
| 3,030,215 A | 4/1962 | Veatch et al. | |
| 3,129,086 A | 4/1964 | Veatch et al. | |
| 3,230,064 A | 1/1966 | Veatch et al. | |
| 3,365,315 A | 1/1968 | Beck et al. | |
| 3,463,231 A | 8/1969 | Hutchison et al. | |
| 3,819,519 A | 6/1974 | Sharman et al. | |
| 4,279,632 A | 7/1981 | Elleman et al. | |
| 4,391,646 A | 7/1983 | Howell et al. | |
| 4,767,726 A | 8/1988 | Marshall | |
| 5,311,946 A * | 5/1994 | Harry ................... | C09K 8/5755 166/278 |
| 5,420,174 A * | 5/1995 | Dewprashad .......... | C09K 8/685 507/220 |
| 5,721,311 A | 2/1998 | Oien | |
| 6,138,760 A | 10/2000 | Lopez et al. | |
| 6,172,011 B1 * | 1/2001 | Card ........................ | C09K 8/62 166/280.2 |
| 6,280,849 B1 | 8/2001 | Miwa et al. | |
| 6,644,405 B2 | 11/2003 | Vijn et al. | |
| 7,132,389 B2 | 11/2006 | Lee | |
| 7,767,629 B2 | 8/2010 | Shinbach et al. | |
| 8,324,135 B2 * | 12/2012 | Hunter et al. ................ | 507/110 |
| 2005/0244641 A1 * | 11/2005 | Vincent .................... | C09K 8/62 428/403 |
| 2006/0073980 A1 * | 4/2006 | Brannon .................. | C09K 8/72 507/103 |
| 2009/0038797 A1 * | 2/2009 | Skala ....................... | C09K 8/80 166/280.1 |
| 2009/0149353 A1 | 6/2009 | Dajani et al. | |
| 2009/0247430 A1 * | 10/2009 | Fu .......................... | C09K 8/685 507/211 |
| 2010/0093564 A1 | 4/2010 | Hunter et al. | |
| 2010/0181070 A1 * | 7/2010 | Harris ...................... | C09K 8/04 166/280.1 |
| 2011/0278003 A1 * | 11/2011 | Rediger ................. | C09K 8/805 166/280.1 |

FOREIGN PATENT DOCUMENTS

EP    0091555 A1    10/1983

* cited by examiner

*Primary Examiner* — John J Figueroa
(74) *Attorney, Agent, or Firm* — C. Michael Geise

(57) ABSTRACT

There is provided aqueous fluids comprising a mixture of at least two polysaccharides, water, and glass microspheres having pacified surfaces. There is also provided a method for making a fluid the method comprising (a) selecting a plurality of glass microspheres having alkaline surfaces; (b) coating the surfaces of the plurality of glass microspheres with an acid; and (c) combining the coated glass microspheres with (i) a mixture comprising at least two cross-linkable polysaccharides, and (ii) water. The fluids are useful, for example, as a drilling fluid.

13 Claims, No Drawings

FLUID COMPOSITION COMPRISING GLASS MICROSPHERES AND METHOD OF MAKING AND USING THE SAME

BACKGROUND

In oil drilling operations, a drilling fluid is typically circulated downwardly through a drill string to cool and lubricate the drill string, suspend the cuttings removed from the well bore, and to keep out formation fluids.

Both aqueous and oil-based drilling fluid systems are known. In some cases lower cost aqueous systems can be combined with oil-based systems for specific uses. These uses include instances when increased lubricity at a drilling head is desired or in traversing formations that would be adversely affected by a water-based system. One such situation is use in water soluble shale formations.

Aqueous drilling fluids typically comprise a viscosifying agent, generally a clay (e.g., a solid phase bentonite, attapulgite, or sepiolite), and a water fluid vehicle. In addition, salt or salt water can be added to the components of the drilling fluid to prepare a salt water drilling fluid. Various additives are also commonly employed to control viscosity, yield point, gel strength (thixotropic properties), pH, fluid loss, tolerance to contaminants (e.g., salt and calcium carbonate), lubricating properties, filter caking properties, cooling and heat transfer properties, and tolerance to inactive solids such as sand and silt or active native mud making clays (e.g., smectites, illites, kaolinites, chlorites, etc.). Clays are not usually used as the sole viscosifying agent, and typically organic water-soluble polymers (e.g., starch, carboxymethylcellulose, natural gums, or synthetic resins) are used in conjunction with clays. These organic water-soluble polymers also aid the clay component of the drilling fluid to serve as a filtration aid to prevent or retard the drilling fluid from being lost into the formation.

Some well operators have used hollow microspheres (also referred to as "bubbles") to reduce the density of the drilling fluid (mud). Certain combinations of aqueous drilling fluids (e.g., those comprising polysaccharides and dissolved salt (e.g., dissolved NaCl and $CaCl_2$)) and certain glass bubbles (e.g., soda-lime-borosilicate glasses such as those marketed by 3M Company, St. Paul, Minn., under the trade designation "HGS18000") undesirably tend to form a gel, rather than remain as a liquid. There is a need to provide fluids that, when having such combinations of materials, do not gel (i.e., remain fluid).

SUMMARY

In one aspect, the present disclosure provides a method of making a fluid, the method including (a) selecting a plurality of glass microspheres having alkaline surfaces; (b) coating the surfaces of the plurality of glass microspheres with an acid; and (c) combining the coated glass microspheres with (i) a mixture comprising at least two cross-linkable polysaccharides, and (ii) water. In some aspects, the present disclosure also provides an additional step of mixing the (i) a mixture comprising at least two cross-linkable polysaccharides, and (ii) water before combining them with the coated glass microspheres in step (c).

In another aspect, the present disclosure provides a fluid including (a) a mixture comprising at least two cross-linkable polysaccharides; (b) water; and (c) glass microspheres having pacified surfaces.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

As used herein the term "cross-linkable polysaccharides" means at least one linking interaction between one moiety of a first polysaccharide and one moiety of a second polysaccharide, where the interaction can be hydrogen bonding, covalent bonding, ionic bonding, and van der Waals forces. Cross-linking can also occur with the use of a cross-linking agent that may or may not be incorporated between the reactive groups on the polysaccharides.

As used herein the term "pacified surface" means conversion of the surface of the glass microspheres from a potentially reactive surface to an inert surface or encapsulation of glass microspheres having a potentially reactive surface with a material to provide an inert outer surface.

Aqueous fluids (e.g., drilling fluids) comprising polysaccharides useful for the present invention are known in the art, and are available commercially, for example, from Baker Hughes, Houston, Tex.; M-I LLC, Houston, Tex.; and Halliburton, Houston, Tex.

Exemplary polysaccharides present in the aqueous fluids include at least one of xanthan gum, guar gum, starch, or cellulose (e.g., polyanioninc cellulose). Exemplary dissolved salts which may be present in the fluids include sodium chloride (NaCl) and calcium chloride ($CaCl_2$).

In some embodiments, the aqueous fluids (e.g., typically for drilling fluid) include a viscosifying component in an amount sufficient to increase the viscosity of the composition. Exemplary viscosifying components include bentonite, asbestos, sepiolite, attapulgite, cellulose derivatives, and combinations thereof.

Hollow microspheres useful in the present invention include glass bubbles. Glass bubbles useful in the present invention need not be perfectly spherical, and may, for example, be cratered or ellipsoidal. Suitable glass bubbles can be made by techniques known in the art and/or are commercially available. For example, techniques for making glass bubbles are reported, for example, in U.S. Pat. No. 2,978,340 (Veatch et al.), U.S. Pat. No. 3,030,215 (Veatch et al.), U.S. Pat. No. 3,129,086 (Veatch et al.), U.S. Pat. No. 3,230,064 (Veatch et al.), U.S. Pat. No. 3,365,315 (Beck), U.S. Pat. No. 4,279,632 (Howell), U.S. Pat. No. 4,391,646 (Howell), and U.S. Pat. No. 4,767,726 (Marshall), and European Pat. No. 0091555 (Sands). A variety of glass bubble formulations are known in the art, including various soda-lime-borosilicate glasses. For example, one exemplary soda-lime-borosilicate glass bubble formulation comprises, by weight, at least 90%, 94%, or even 97% of glass that in turn comprises at least 67% $SiO_2$, (e.g., a range of 70% to 80% $SiO_2$), a range of 8% to 15% CaO, a range of 3% to 8% $Na_2O$, a range of 2% to 6% $B_2O_3$, and a range of 0.125% to 1.5% $SO_3$.

Glass bubbles are commercially available, for example, from 3M Company, St. Paul, Minn. under the trade designations "3M HOLLOW GLASS MICROSPHERES, HGS SERIES" (e.g., "HGS18000") and "3M GLASS BUBBLES" (e.g., grades HGS10000, HGS10000HS, HGS8000X, iM30K, K1, K15, S15, S22, K20, K25, S32, K37, S38, S38HS, S38XHS, S42XHS, K46, (A16/500, A20/1000, D32/4500, and H50/10000); and from Potters Industries, Valley Forge, Pa., (an affilate of PQ Corporation) under the trade designation "SPHERICEL HOLLOW GLASS SPHERES" (e.g., grades 110P8 and 60P18) and "ECODRILL"; and from Silbrico Corp., Hodgkins, Ill. under the trade designation "SIL-CELL" (e.g., grades SIL 35/34, SIL-32, SIL-42, and SIL-43).

Glass microspheres can be made from the aforementioned water insoluble glass or water-soluble glass, such as sodium silicate. Where aqueous fluids are used it is preferable for the glass microspheres to comprise water insoluble glass.

Typically, the glass microspheres have diameters in a range from about 5 micrometers to about 500 micrometers (in some embodiments, in a range from about 50 micrometers to about 300 micrometers, or even about 75 micrometers to about 200 micrometers), although sizes outside of these ranges may also be useful. Typically, the hollow glass microspheres have diameters in a range from about 5 micrometers to about 250 micrometers (in some embodiments, in a range from about 10 micrometers to about 110 micrometers, or even about 10 micrometers to about 70 micrometers), although sizes outside of these ranges may also be useful. In some embodiments, the hollow glass microspheres have median diameters in a range from 20 micrometers to about 40 micrometers.

For fluids comprising hollow glass microspheres, typically the amount of hollow glass microspheres present are sufficient to reduce the density of the fluid at least 5% to even at least 30%. In some embodiments, the amount of hollow glass microspheres present is sufficient to reduce the density of the fluid at least 5%, at least 10%, at least 15%, at least 20%, at least 25%, or even at least 30%. In some embodiments, the hollow glass microspheres comprise in a range from about 25% to about 50% by volume of the fluid. In some embodiments, reducing the density of the fluid is advantageous, for example, by significantly reducing the pressures required to raise a drilling fluid to the surface, as well as in reducing the associated pumping costs.

The compressive strength required of the hollow glass microspheres useful in the present invention is dependent on the particular intended use of the fluid. For example in drilling applications, the compressive strength required of the hollow glass microspheres is typically dictated by the bottom hole pressure in which it will be employed. At shallow depths, the compressive strength of the hollow glass microspheres does not have to be high, but in very deep wellbores, and/or at very great depths under the sea, the hydrostatic pressure exerted on the hollow glass microspheres becomes enormous, and the hollow glass microspheres should have very high resistance to collapse (high compressive strengths). Hollow glass microspheres, because of their generally spherical form, provide resistance to compression equally from all directions (isotropic compressive strength), and are ideally suited for this application. Generally, the hollow glass microspheres component has a collapse strength of at least 2000 psi (13.8 MPa) to at least 18,000 psi (124.1 MPa). In some embodiments, the hollow glass microspheres component has a collapse strength of at least 2000 psi (13.8 MPa), at least 3000 psi (20.7 MPa), at least 4000 psi (27.6 MPa), at least 5500 psi (37.9 MPa), at least 6000 psi (41.1 MPa), at least 10,000 psi (68.9 MPa), or at least even 18,000 psi (124.1 MPa)).

Other additives that may be included in fluids described herein include alkalinity and pH control additives, bactericides, calcium reducers, corrosion inhibitors, defoamers, emulsifiers, filtrate reducers, flocculants, foaming agents, hydrate suppressants, lost circulation materials, lubricants/pipe-freeing agents, shale control inhibitors, surface active agents, temperature stability agents, thinners, dispersants, viscosifiers, and weighting materials. In some embodiments, the additive(s) is added to the fluid directly, before or after addition of the glass microspheres. In some embodiments, the additive is added to the glass microspheres before they are added to the other components of the fluid, such as, for example, two cross-linkable polysaccharides and water.

Optionally, mixing gas (e.g., nitrogen, carbon dioxide, or air) bubbles into fluids to form foams can be carried out using one of several methods known in the art. Such methods include those described, for example, in U.S. Pat. No. 3,463,231 (Hutchison et al.) and U.S. Pat. No. 3,819,519 (Sharman et al.).

Presently disclosed fluids may be made using a variety of different processes. In some embodiments, a process for preparing a fluid includes the steps of selecting a plurality of glass microspheres having alkaline surfaces; coating the surfaces of the plurality of glass microspheres with an acid; combining the coated glass microspheres with (i) a mixture comprising at least two cross-linkable polysaccharides, and (ii) water. In some embodiments, the method of preparing a fluid also includes the step of mixing the mixture comprising at least two cross-linkable polysaccharides and the water before combining them with the coated glass microspheres. In some embodiments, glass microspheres are coated with mineral or organic acids by placing an appropriate amount of material into a mixer, fluidizing, optionally heating the glass microspheres, then spraying an appropriate amount of acid, in liquid form, over a period of time. After spraying, the material is maintained at a temperature that can "dry" the sample by evaporative removal of solvent or water. Any acid may be used in the present disclosure, such as, for example, phosphoric acid, boric acid, acetic acid, stearic acid, and the like. In some embodiments, the acid is diluted in a co-solvent before being mixed with the glass microspheres. In some embodiments, the ratio of acid to solvent is a 1 to 1 ratio. In some exemplary embodiments, phosphoric acid is diluted in isopropyl alcohol in a 1 to 1 ratio before being mixed with the glass microspheres.

Pure hollow glass microspheres (with little or no previously applied coatings, flow aids or other topically added materials) are added to a mixer of suitable design. Mixers suitable for hollow glass microspheres coating are fluidized bed or vortex or curtain or ribbon blenders or Ross mixers (examples; horizontal fluidized bed mixer from Littleford Day Inc. of Florence, Ky., vortex mixer from Zeppelin-Reimelt GmbH Kassel, Germany, curtain mixers from Continental Mixer, Osseo, Wis., ribbon blenders and Ross mixers from Ross from Charles Ross and Son Company, Hauppauge, N.Y.). For low density hollow glass microspheres it is desirable to have a covered or sealed mixer to prevent loss of material due to lifting. It is generally desirable to have a heated mixer that can achieve temperatures hot enough to volatilize water or other solvents.

In some embodiments, to prepare for spray coating, the hollow glass microspheres are agitated and optionally heated. When the mixer has achieved optimal fluidization of the hollow glass microspheres and the desired temperature the liquid coating is sprayed on to the agitated hollow glass microspheres via an air (or nitrogen) assisted spray nozzle that has been designed to spray coat the particles over a significant length of time (generally 2 to 10 minutes depending on the amount of liquid dispensed). The hollow glass microspheres are continually agitated during and after spraying. After spraying volatile solvent, water and/or reaction products are volatilized from the mixer, usually accelerated by heating. The coated hollow glass microspheres are then cooled while agitated.

Exemplary embodiments of the present disclosure include, but are not limited to:

1. A method of making a fluid the method comprising:
   (a) selecting a plurality of glass microspheres having alkaline surfaces;
   (b) coating the surfaces of the plurality of glass microspheres with an acid; and
   (c) combining the coated glass microspheres with (i) a mixture comprising at least two cross-linkable polysaccharides, and (ii) water.

2. The method according to embodiment 1, wherein the fluid does not gel until after 66 days at ambient conditions.

3. The method according to any preceding embodiment, wherein the mixture of cross-linkable polysaccharides comprises at least two of xanthan gum, guar gum, starch, tamarind seed, gum arabic, modified gum arabic, glycogen, chitin, or cellulose.

4. The method according to any preceding embodiment, wherein the water further comprising a dissolved salt.

5. The method according to any preceding embodiment, further comprising diluting the acid used in step (b) in a co-solvent before coating the surface of the plurality of glass microspheres therewith.

6. The method according to embodiment 5 wherein the ratio of acid to co-solvent is a 1 to 1 ratio.

7. The method according to embodiment 6 wherein the co-solvent is isopropyl alcohol.

8. The method according to any preceding embodiment, wherein the wherein the glass microspheres comprise water insoluble glass.

9. The method according to any preceding embodiment, wherein the fluid has a pH ranging from 6 to 8.

10. A method according to any preceding embodiment, further comprising mixing the (i) a mixture comprising at least two cross-linkable polysaccharides, and (ii) water before combining them with the coated glass microspheres in step (c).

11. The method according to any preceding embodiment wherein the glass microspheres are hollow.

12. The method according to any preceding embodiment wherein the glass microspheres are solid.

13. The method according to any the preceding embodiment further comprising adding at least one additive to the fluid.

14. The method according to embodiment 13 wherein the additive comprises at least one selected from alkalinity and pH control additives, bactericides, calcium reducers, corrosion inhibitors, defoamers, emulsifiers, filtrate reducers, flocculants, foaming agents, hydrate suppressants, lost circulation materials, lubricants/pipe-freeing agents, shale control inhibitors, surface active agents, temperature stability agents, thinners, dispersants, viscosifiers, and weighting materials.

15. A fluid comprising:
   (a) a mixture comprising at least two cross-linkable polysaccharides;
   (b) water; and
   (c) glass microspheres having pacified surfaces.

16. The fluid of embodiment 15 further comprising a pH of the fluid of ranging from 6 to 8.

17. The fluid according to embodiment 15 or 16 further comprising a dissolved salt.

18. The fluid according to any of embodiments 15, 16, or 17 wherein the glass microspheres comprise water insoluble glass.

19. The fluid according to any of embodiments 15, 16, 17, or 18 wherein the glass microspheres are hollow.

20. The fluid according to any of embodiments 15, 16, 17, or 18 wherein the glass microspheres are solids.

21. The fluid according to any of embodiments 15, 16, 17, 18, 19 or 20, wherein the cross-linkable polysaccharide mixtures comprises least two of xanthan gum, guar gum, starch, tamarind seed, gum arabic, modified gum arabic, glycogen, chitin, or cellulose.

22. The fluid according to any of embodiments 15, 16, 17, 18, 19, 20 or 21 further comprising at least one additive.

23. The fluid according to embodiment 22 wherein the additive comprises at least one selected from alkalinity and pH control additives, bactericides, calcium reducers, corrosion inhibitors, defoamers, emulsifiers, filtrate reducers, flocculants, foaming agents, hydrate suppressants, lost circulation materials, lubricants/pipe-freeing agents, shale control inhibitors, surface active agents, temperature stability agents, thinners, dispersants, viscosifiers, and weighting materials.

The following examples are offered to aid in the understanding of the present invention and are not to be construed as limiting the scope thereof. Unless otherwise indicated, all parts and percentages are by weight.

EXAMPLES

Materials:

Hollow glass microspheres were obtained from 3M Company, St. Paul, Minn., under the trade designations "3M GLASS BUBBLES HGS8000X", and "3M GLASS BUBBLES HGS10000".

Xanthan gum was obtained from R. T. Vanderbilt Company, Norwalk, Conn., under the trade designation "VAN-ZAN NF-ED".

Potassium chloride was obtained from Mallinckrodt Baker, Phillipsburg, N.J.

Artificial drilling solids were obtained under the trade designation "REV DUST", commercially available, for example, from Diversities Technologies, Edmonton, Canada.

Phosphoric acid 85% was obtained from Mallinckrodt Baker, Phillipsburg, N.J.

An epoxy silane was obtained from Dow Corning, Midland, Mich., under the trade designation "Z6040".

An amino silane was obtained from Dow Corning under the trade designations "Z6020" and "Z-6011".

Comparative Composition A:

A fluid was prepared following the procedure outlined in API 131, "Recommended Practice for Laboratory Testing of Drilling Fluids". First, a 10% potassium chloride solution was prepared by adding 111 grams of potassium chloride to 1 L of water in a container. Subsequently, 1 gram of "VANZAN NF-ED" was slowly sifted into 360 grams of the potassium chloride solution while stirring with a mixer set (available from VMA-Getzmann, Reichshof, Germany, under the trade designation "DISPERSAMAT") at high shear for 15 minutes. Approximately 30 grams of "REV DUST" were then added to the mixture while continuing to stir with the mixer set at high shear for 15 minutes.

Comparative Coated Glass Microspheres A were prepared according to the following description: "3M GLASS BUBBLES HGS8000X" were placed into a batch mixer (model "FM 1300" available from Littleford Day, Florence, Ky.) and agitated until the glass microspheres were fluidized. The glass microspheres were then coated with amino silane ("Z6020") at a 10% coating by weight (i.e., for 100 grams of microspheres, 10 grams of the coating solution were used). The coating solution was sprayed onto the agitated glass microspheres via an air assisted spray nozzle for 3 to 5 minutes. Still under agitation, the coated glass microspheres were heated to a temperature of 130° C. for 20 to 30 minutes, and subsequently allowed to cool to room temperature.

Comparative Composition A was prepared by mixing 108.8 grams of fluid with 10 grams of Comparative Coated Glass Microspheres A in a 500 mL glass jar. The jar was capped and hand shaken before being placed in a shaker for 40 minutes to complete the blending. Subsequently, the pH was measured and the jar was placed on a workbench for 15 days for gel determination by visual inspection.

Comparative Composition B:

Comparative Coated Glass Microspheres B were prepared as described in Comparative Composition A, except that the glass microspheres were coated with an epoxy silane ("Z6040"). Comparative Composition B was prepared by mixing 83.75 grams of fluid prepared as described in Comparative Example A with 7.7 grams of Comparative Coated Glass Microspheres B.

Comparative Composition C:

Comparative Composition C was prepared by mixing 108.8 grams of fluid prepared as described in Comparative Composition A with 10 grams of uncoated "3M GLASS BUBBLES HGS8000X".

Composition 1:

Coated Glass Microspheres 1 was prepared as described in Comparative Composition A, except that "3M GLASS BUBBLES HGS10000" were coated at a 3% initial coating weight with a solution of 85 wt % phosphoric acid diluted in isopropyl alcohol at a 1:1 ratio. Composition 1 was prepared by mixing 100 grams of fluid prepared as described in Comparative Composition A with 10 grams of Coated Glass Microspheres 1.

The pH was measured for each composition using a basic benchtop pH meter commercially available under the trade designation "PerpHecT", Model Orion 320 available from Thermo Scientific, Waltham, Mass. Samples of the compositions were also placed on a workbench for 15 days in order to visually determine formation of gel. A summary of Comparative Compositions A, B and C and Composition 1 as well as the pH values and formation of gel (reported as a function of time) are shown in Table 1, below.

TABLE 1

Composition, pH and formation of gel.

| Examples | Glass microspheres | Coating | Coating weight (%) | Fluid (g) | Glass microspheres (g) | pH | Formation of gel (days) |
|---|---|---|---|---|---|---|---|
| Comparative Composition A | 3M GLASS BUBBLES HGS8000X | Amino silane Z6020 | 10 | 108.8 | 10 | 8.84 | 4 |
| Comparative Composition B | 3M GLASS BUBBLES HGS8000X | Epoxy silane Z6040 | 10 | 83.75 | 7.7 | 9.62 | 4 |
| Comparative Composition C | 3M GLASS BUBBLES HGS8000X | None | 0 | 108.8 | 10 | 8.49 | 4 |
| Composition 1 | 3M GLASS BUBBLES HGS10000 | Phosphoric acid 85% | 3 | 100 | 10 | 6.23 | None |

Various modifications and alterations of this invention will be apparent to those skilled in the art without departing from the scope and spirit of this invention, and it should be understood that this invention is not limited to the illustrative embodiments set forth herein.

What is claimed is:

1. A method of making a fluid the method comprising:
   (a) selecting a plurality of glass microspheres having alkaline surfaces;
   (b) coating the surfaces of the plurality of glass microspheres with an acid; and
   (c) combining the coated glass microspheres with (i) a mixture comprising at least two cross-linkable polysaccharides, and (ii) water.

2. The method according to claim 1, wherein the mixture of cross-linkable polysaccharides comprises at least two of xanthan gum, guar gum, starch, tamarind seed, gum arabic, modified gum arabic, glycogen, chitin, or cellulose.

3. The method according to claim 1, wherein the water further comprises a dissolved salt.

4. The method according to claim 1, further comprising diluting the acid used in step (b) in a co-solvent before coating the surface of the plurality of glass microspheres therewith.

5. The method according to claim 4 wherein the ratio of acid to co-solvent is a 1 to 1 ratio.

6. The method according to claim 5 wherein the co-solvent is isopropyl alcohol.

7. The method according to claim 1, wherein the glass microspheres comprise water insoluble glass.

8. The method according to claim 1, wherein the fluid has a pH ranging from 6 to 8.

9. A method according to claim 1, further comprising mixing the (i) a mixture comprising at least two cross-linkable polysaccharides, and (ii) water before combining them with the coated glass microspheres in step (c).

10. The method according to claim 1 wherein the glass microspheres are hollow.

11. The method according to claim 1 wherein the glass microspheres are solid.

12. The method according to claim 1 further comprising adding at least one additive to the fluid.

13. The method according to claim 12 wherein the additive comprises at least one selected from alkalinity and pH control additives, bactericides, calcium reducers, corrosion inhibitors, defoamers, emulsifiers, filtrate reducers, flocculants, foaming agents, hydrate suppressants, lost circulation materials, lubricants/pipe-freeing agents, shale control inhibitors, surface active agents, temperature stability agents, thinners, dispersants, viscosifiers, and weighting materials.

* * * * *